Patented Sept. 30, 1941

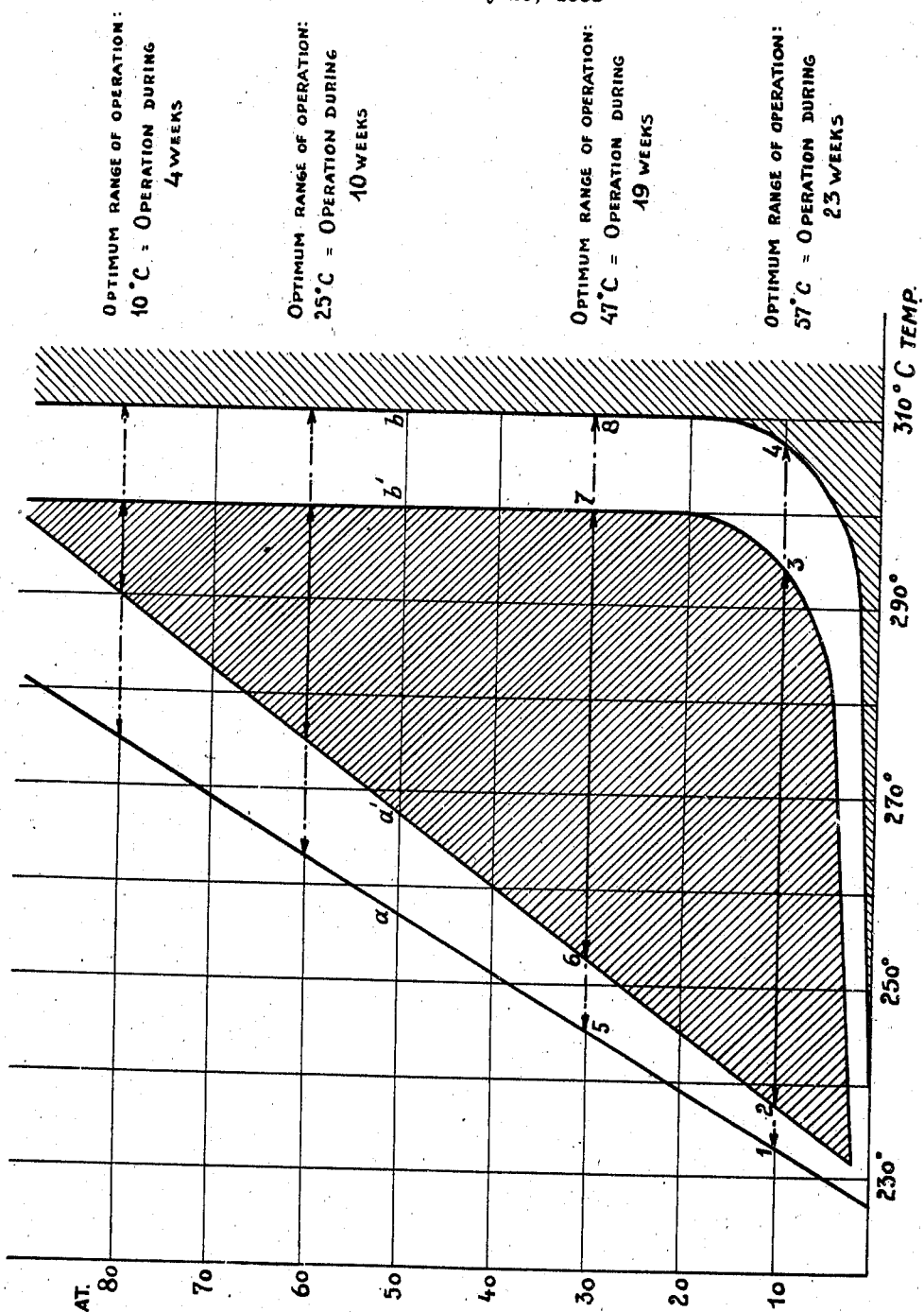

2,257,457

UNITED STATES PATENT OFFICE 2,257,457

PRODUCTION OF ALIPHATIC HYDROCARBONS

Franz Fischer and Helmut Pichler, Mulheim, Ruhr, Germany, assignors, by mesne assignments, to Hydrocarbon Synthesis Corporation, Linden, N. J.

Application July 23, 1938, Serial No. 220,919
In Germany July 31, 1937

9 Claims. (Cl. 260—449)

Our invention relates to the production of aliphatic hydrocarbons, both solid or liquid or readily liquefiable, from gas mixtures containing carbon monoxide and hydrogen. It has particular reference to a process of this kind, in which the gases are reacted in the presence of iron or of mixed catalysts containing iron.

It is an object of our invention to provide means whereby the yield of valuable hydrocarbons of the kind mentioned above produced in the presence of iron catalysts or catalysts containing besides iron also another metal is rendered more economical than was hitherto possible.

It is known to produce compounds containing oxygen, such as methanol or "synthol," by subjecting gas mixtures containing carbon monoxide and hydrogen to temperatures of 400° C. and above under high pressure. One has further succeeded in producing under a pressure of 10 to 15 atmospheres and in the presence of catalysts obtained by decomposing iron nitrate, products which partly consisted of oxygen containing compounds and partly of hydrocarbons. One has also obtained hydrocarbons when operating under atmospheric pressure. According to the printed publications hitherto published catalysts containing iron enable total yields of aliphatic hydrocarbons amounting to 30-35 grams per cubic meter of the mixture of carbon monoxide and hydrogen to be obtained at atmospheric pressure, however only during an operating period of about eight days, since at the end of this period the efficiency of the catalysts drops considerably. The yields obtainable with catalysts produced by precipitation and those produced by decomposition were approximately equal (Brennstoffchemie (1935) vol. 16, p. 2). No publication regarding better yields of hydrocarbons when operating under increased pressure have been found (Brennstiffchemie (1927) vol. 8, p. 167).

We have now found that surprisingly high yields of mainly low boiling and knocking-proof hydrocarbons can be obtained during long operating periods in the presence of catalysts containing iron, if the following combination of operating conditions is observed: The temperature must remain below 320° C., the pressure may be varied between 2 and 100 atmospheres and should preferably range between 2 and 50 atmospheres. A starting gas such as water gas or some other mixture containing a still higher proportion of carbon monoxide should be used; the catalysts produced either by precipitation or by decomposition should in order to obtain the best yields be subjected before starting operations to a preliminary treatment at a lower pressure than the operating pressure, preferably atmospheric pressure, in contact with gases containing carbon monoxide, for instance with the gas mixture to be treated in the operation.

If it is intended to lead the reaction between the carbon monoxide and the hydrogen as far as possible in the direction of the formation of hydrocarbons in the presence of catalysts containing iron, the gas mixture should contain the two constituents substantially in the proportion expressed by the equation

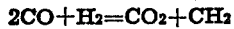

$$2CO + H_2 = CO_2 + CH_2$$

i. e. preferably between $2CO:1H_2$ and $1CO:1H_2$. While complete conversion of such a gas mixture is not possible under atmospheric pressure nor under the operating pressure, if started directly, we have found that it can be carried through practically quantitatively under increased pressure after the contact has been activated by a preliminary treatment, for instance at atmospheric pressure.

Preferably the pressure and temperature are chosen at a predetermined ratio, as shown in the diagram illustrated in the drawing which forms part of this specification.

Here the abscissa indicates the operating temperature, the ordinates the pressures. The straight line $a$ indicates the lower temperature limit for different operating pressures, at which the synthetical production of hydrocarbons can be carried through with satisfactory yield. The line $a$ shows that the temperature to be used at the beginning of the process must be chosen the higher, the higher the operating pressure. The straight line $b$ indicates the upper temperature limit, at which liquid hydrocarbons still preponderate amongst the products obtained. Under pressures of 10 to 90 atmospheres this temperature is about 310° C. At higher temperatures other reactions, for instance the formation of gaseous products and products containing oxygen, gradually preponderate. The inner hatched part of the diagram indicates the physical conditions under which the best yields are obtained in the presence of active catalysts containing iron and of a gas mixture rich in carbon monoxide. When operating for instance under 10 atmospheres pressure a partial conversion in the desired direction is already reached at point 1 (230 to 235°). If the temperature is raised up to point 2 (in this case to approximately 240°) the best yields of liquid hydrocarbons are obtained, about 100–150 grams per cubic meter of the starting gas, in proportion to the quantity of gas passing through the reaction zone. The gas escaping from the reaction zone then consists mostly of carbon dioxide, of inert constituents which may be present and of gasol and gaseous hydrocarbons formed as by-products. There is further formed solid paraffin and some grams water per cubic meter of the gas. If it is intended to keep the process going during long periods of operation, it is necessary in order to keep the yield constant, to gradually raise the operating temperature, for instance by 2–3° per week. Now almost 60° are available from point 2 to point 3. If one does not insist upon the best, i. e. not upon an almost complete conversion of the carbon monoxide, the temperature can still be raised some time to about 305 to 310° C. When operating under a pressure of 30 atmospheres, the lower optimum of the temperature limit, when using a catalyst and a gas mixture as described above, lies at 250 to 255° C. (point 6 of the diagram). From point 6 to point 7 a temperature interval of about 47° C. is available, which, if the reaction temperature is raised by 2–3° per week, corresponds to a 5 months period of operation.

The closing up of the lines $a$ and $b$ or $a'$ and $b'$ under higher pressures of operation shows that in proportion as the pressure rises, the periods of operation, during which the process can be kept going, become gradually shorter, since the required rise of temperature in proportion to the time remains the same under the different pressures.

The diagram shows that pressures above 100 atmospheres cannot be used in this process and that at pressures above 50 atmospheres the economy of the process drops rapidly. The diagram also shows that under atmospheric or slightly raised pressure no economical yields can be obtained. The optimum lies between 5 and 50 atmospheres.

It is particularly important to note that in order to obtain high yields under the conditions of operation mentioned above without requiring a long starting period, it is necessary to subject the catalyst prepared by precipitation or decomposition to a preliminary treatment with gas containing carbon monoxide at a lower than the subsequent working pressure. If this preliminary treatment is carried through under atmospheric pressure, for instance at 250°, this preliminary treatment lasts about 5 hours. If after this preliminary treatment the pressure is raised, for instance to 15 atmospheres, the maximum yield of the hydrocarbons desired is obtained directly. If one would start directly under a pressure of 15 atmospheres without that preliminary treatment, the maximum yield would not be obtainable even after several weeks. It should further be noted that in the interest of a good yield of higher-molecular hydrocarbons the period of time, during which the gases remain in the reaction zone, should be raised substantially in proportion to the operating pressure, so that for instance under a pressure of 20 atmospheres the gas should remain in contact with the catalyst twice as long as under a pressure of 10 atmospheres.

If it is desired to abduct the heat of reaction by cooling with water, it may be advantageous to operate under a pressure equal to that prevailing above the water, i. e. for instance at 260° C. under a pressure of 50 atmospheres etc., since in that case the walls of the reaction chambers are not acted upon by an increased pressure from the inside nor from the outside.

In operating our invention we may for instance proceed as follows:

Example 1

Ferrous chloride and cupric chloride (iron: copper=4:1) are dissolved in water and precipitated at an elevated temperature with a calculated quantity of sodium carbonate (which may also be replaced by potassium carbonate). The catalyst is filtered off, is washed until it is practically free from alkali, is impregnated with $\frac{1}{8}\%$ potassium carbonate, calculated on iron, dried at 110° C., granulated or compressed or distributed on carriers and filled into the reaction chamber, for instance a solid tube. In order to activate the catalyst, a mixture of carbon monoxide and hydrogen containing for instance $1CO:2H_2$ is first passed at 240° C. under ordinary pressure over the catalyst. The contraction resulting from the conversions slowly rises during three days to 30%. Now the reaction system is placed under pressure and operation continued for instance under 15 atmospheres at 260° C. with a gas mixture containing carbon monoxide and hydrogen in the proportion of 2:2, 4 litres of this gas mixture, calculated for atmospheric pressure, being passed hourly over each 10 grams iron. The contraction then rises to 50%. The yield of hydrocarbons amounts to 130–150 grams per cubic meter of the gas. 80–90 grams consist of solid and liquid hydrocarbons which run off the catalyst into a heated pressure resistive collecting vessel. About 50 grams per cubic meter consist of readily volatile benzine which is carried away as vapor by waste gas and can be recovered with the aid of activated carbon or in some other manner, while the balance of hydrocarbons formed is gasol i. e. gaseous aliphatic hydrocarbons with more than 2 C-atoms in the molecule. The activity of the catalyst remains constant for months if the operating temperature is gradually raised, for instance by 5° per 4 weeks.

Example 2

In a solution, heated to boiling temperature of iron nitrate which contains for instance 50 grams iron per liter, the iron is precipitated, preferably under stirring, by introducing a vigorous current of ammonia. The iron precipitate is separated by filtration and the main part of the ammonium nitrate removed by washing, the last traces escaping during subsequent heating. The washed catalyst is now impregnated with $\frac{1}{4}\%$ potassium carbonate, calculated for iron, is dried at 110° C., granulated or compressed and filled into the catalytic vessel. It is first subjected to a preliminary treatment at about 250° and under atmospheric pressure, with a current of for instance 400 liters per hour and kilogram iron, of a mixture containing carbon monoxide and hydrogen, for instance in the ratio ranging between 1:2 and 3:2, until owing to reactions occurring between CO and $H_2$ a contraction of about 30% occurs. Now the gas mixture to be treated, which contains CO and $H_2$ in the proportion 3:2, is passed through, while the pressure is raised for instance to 15 atmospheres. The contraction rises to 50–56%. With 400 liters gas passing through per hour and kilogram iron 120–130 grams solid or liquid or readily liquefiable hydrocarbons are obtained per cubic meter. In order to keep the contraction and consequently also the percentage of conversion constant the temperature is gradually raised and the yield will then be kept constant through many months.

Example 3

A catalyst obtained by thermic decomposition, for instance at temperatures up to about 300° C., from iron nitrate is alkalinized with ¼% potassium carbonate, calculated for iron, and is filled into a suitable contact apparatus in granular or compressed form or distributed on inert carriers. The contact apparatus must be designed for a complete abduction of the heat of reaction and keeping constant of the temperature. At the beginning the catalyst is pretreated 5-10 hours under atmospheric pressure and at 240-250° C. with a gas mixture containing CO, for instance with the mixture to be reacted, which contains $3CO:2H_2$. Owing to reactions occurring between the carbon monoxide and the hydrogen a 30% contraction of the gases occurs. Now the pressure is raised for instance to 15 atmospheres without raising the temperature and about 400 liters of the mixture of carbon monoxide and hydrogen containing $3CO:2H_2$ are passed through hourly per kilogram iron in the catalyst, the contraction rising directly to 55%. The gas finally formed contains about 50-70% carbon dioxide, but scarcely any water. If the temperature is raised by 2-3° per week, the conversion may be kept constant during half a year. There are formed 110 grams liquid hydrocarbons per cubic meter of the gas under treatment, about 75% of which boil within the range of 30 and 180° C. The content of unsaturated hydrocarbons rises during this operation period from about 40 to 70%. The "benzine" thus obtained is a knocking-proof engine fuel.

Besides the iron catalysts mentioned in the examples also other catalysts containing additions such as manganese compounds or diluents such as kieselguhr or silica gel can be used.

While the use of iron catalysts instead of the high priced nickel and cobalt catalysts merely offers an economical advantage, a new technical effect is obtained in that we have succeeded, by operating in accordance with the present invention to obtain, instead of the low yields hitherto obtained with iron catalysts, which were far lower than those obtainable with cobalt catalysts, about the same yields during particularly long periods of operation, not below six months.

The liquid hydrocarbons obtained are distinguished by the fact that about 80% boil already below 200° C. and that their content of olefines averages 50 to 60% whereby the knocking proofness of the fuel and also the conversion into other products, for instance lubricating oils, is greatly improved. Besides the readily boiling liquid hydrocarbons there are also formed considerable quantities (up to 30 grams per cubic meter) gasol which in view of their still higher olefine content are also suitable for a chemical conversion into other products such as polymerized benzine, lubricating oil, alcohols etc.

Various changes may be made in the details disclosed in the foregoing specification without departing from the invention or sacrificing the advantages thereof.

We claim:

1. The process of producing aliphatic solid, liquid or readily liquefiable hydrocarbons from gas mixtures containing carbon monoxide and hydrogen in the presence of an iron catalyst, which comprises passing a mixture of carbon monoxide and hydrogen under an operating pressure ranging between 2 and 100 atmospheres and at a temperature between about 220 and 320° C. over an iron catalyst which has been subjected to a preliminary treatment with carbon monoxide under a pressure which is considerably lower than the operating pressure subsequently employed.

2. The process of claim 1 in which the gas mixture under treatment contains from about 1 to about 2 mols of CO per mol of H.

3. The process of claim 1, in which the catalyst contains, besides iron, also an other heavy metal.

4. The process of claim 1, in which the period of time during which the gases under treatment in contact with the catalyst is the longer the higher the operating pressure.

5. The process of claim 1, in which the preliminary treatment of the catalyst is carried out with a mixture of carbon monoxide and hydrogen.

6. The process of claim 1, in which the preliminary treatment of the catalyst is carried out with carbon monoxide under atmospheric pressure.

7. The process of claim 1, in which the preliminary treatment of the catalyst is carried out with a mixture of carbon monoxide and hydrogen under atmospheric pressure.

8. The process of claim 1, in which the operating pressure ranges between 5 and 50 atmospheres, the preliminary treatment of the catalyst being carried out at a pressure considerably lower than the operating pressure subsequently employed.

9. The process of claim 1, in which the catalyst contains, besides iron, also a potassium carbonate.

FRANZ FISCHER.
HELMUT PICHLER.